(12) United States Patent
Kitahara et al.

(10) Patent No.: US 7,266,070 B2
(45) Date of Patent: Sep. 4, 2007

(54) OBJECTIVE LENS FOR DIFFERENT OPTICAL RECORDING MEDIA AND AN OPTICAL PICKUP DEVICE UTILIZING IT

(75) Inventors: Yu Kitahara, Saitama (JP); Tetsuya Ori, Koshigaya (JP); Toshiaki Katsuma, Tokyo (JP)

(73) Assignee: Fujinon Corporation, Saitama (JP)

( * ) Notice: Subject to any disclaimer, the term of this patent is extended or adjusted under 35 U.S.C. 154(b) by 638 days.

(21) Appl. No.: 10/808,301

(22) Filed: Mar. 25, 2004

(65) Prior Publication Data

US 2004/0202087 A1 Oct. 14, 2004

(30) Foreign Application Priority Data

Mar. 28, 2003 (JP) .............................. 2003-091382

(51) Int. Cl.
*G11B 7/00* (2006.01)
(52) U.S. Cl. .............................. 369/112.25; 269/112.08
(58) Field of Classification Search ........... 369/112.23, 369/112.25, 112.05, 112.08
See application file for complete search history.

(56) References Cited

U.S. PATENT DOCUMENTS 6,636,365 B2 * 10/2003 Saito et al. .................. 359/719
6,781,771 B2 * 8/2004 Kitahara et al. ......... 369/112.23
6,807,139 B2 * 10/2004 Sakamoto .............. 369/112.07
6,995,909 B1 * 2/2006 Hayashi et al. ......... 369/112.06
7,027,377 B2 * 4/2006 Fujita et al. ........... 369/112.01

FOREIGN PATENT DOCUMENTS

| JP | 2000-081566 | 3/2000 |
|---|---|---|
| JP | 2001-235676 | 8/2001 |
| JP | 2002-109775 | 4/2002 |

\* cited by examiner

*Primary Examiner*—Thang V Tran
(74) *Attorney, Agent, or Firm*—Arnold International; Bruce Y. Arnold

(57) ABSTRACT

An objective lens and an optical pickup device utilizing it are disclosed wherein the objective lens includes a specified aspheric surface profile having a discontinuity and a single specified diffraction optical surface so to provide a focusing effect which is usable with different optical recording media, such as a CD versus a DVD. By providing a single diffraction surface and an aspheric surface having a discontinuity, more freedom of design is achieved for the diffraction surface than would otherwise be possible. The objective lens according to the invention is designed so as to be both compact and inexpensive and enables recording/playback onto either type optical recording media using different wavelengths and different numerical apertures, depending on the recording medium used.

10 Claims, 5 Drawing Sheets

λ = 657nm

λ = 790nm

λ = 650nm

λ = 780nm

OBJECTIVE LENS FOR DIFFERENT OPTICAL RECORDING MEDIA AND AN OPTICAL PICKUP DEVICE UTILIZING IT

BACKGROUND OF THE INVENTION

Recently, various optical pickup devices have been developed which can record onto or playback from different optical recording media, depending on the optical recording medium employed. For example, there are devices which record and play back DVD (Digital Versatile Disks, including -ROM, -R, -RW, etc.) and CD (Compact Disk, including -ROM, -R, -RW, etc.) using one optical pickup device. In such optical recording media, visible light having a wavelength of about 650 nm is used with a DVD so as to improve the recording density whereas near-infrared light having a wavelength of about 780 nm is used with a CD, because there are some recording media that have no sensitivity to light in the visible range. Therefore, in an optical pickup device which can be shared by these two types of recording media, a so-called two-wavelength beam scheme is employed wherein light beams of two different wavelengths are used as the irradiation light.

In the case of using a DVD or CD, when the disk thickness and numerical aperture are different between the two optical recording media, the optical pickup device needs to have different focusing actions for light of the different respective wavelengths in order to perform recording/playback. For example, there is an approximate unified standard wherein the disk thickness is 0.6 mm and the numerical aperture NA is 0.6 for DVD recording/playback, and the disk thickness is 1.2 mm and the numerical aperture for CD recording/playback is in the range $0.45 \leq NA \leq 0.52$.

It is known in the prior art technology to have one surface of the objective lens be an aspheric surface with a ring-shaped diffraction grating that is centered on the optical axis. Such a design enables miniaturization and cost reduction of the optical pickup device to be achieved, as disclosed, for example, in Japanese Laid-Open Patent Applications 2000-81566, 2001-235676, and 2002-109775. In the optical pickup devices disclosed in these patent applications, the variation in spherical aberration due to the thickness of the protective layer is, ideally, canceled by the effect of the diffraction grating so as to form high quality focus spots for the two kinds of optical recording media using a single objective lens.

Also, Japanese Laid-Open Patent Applications 2001-235676 and 2002-109775 disclose technologies wherein a diffraction optical surface that is formed on an aspheric surface is such that the phase difference at a specified position of the aspheric surface is discontinuous, to thereby form a high quality beam spot even for an optical recording medium that requires a small numerical aperture and does not use any of: (a) a liquid crystal shutter, (b) an aperture stop formed of a wavelength-selective filter, etc. or (c) an aperture limiting method which mechanically switches among multiple apertures.

In the objective lens disclosed in the Japanese Laid-Open Patent Application 2000-81566, even when using a small numerical aperture, the light flux passing in an outer region is corrected for aberrations using the same diffraction grating as that for the inner region. Therefore, a high quality beam spot is not produced for both wavelengths used for recording/playback.

Also, the objective lenses disclosed in Japanese Laid-Open Patent Applications 2001-235676 and 2002-109775 are constructed so that the diffraction optical surface is discontinuous at a specified position, and different phase difference functions are employed for the inner region versus the outer region relative to the specified position. However, if the two phase difference functions are such that the phase difference between them is not an integer multiple of $2\pi$ at the specified position, the wave-front aberration of the transmitted light flux increases. However, making both phase difference functions such that the phase difference between them at a specified position is an integer multiple of $2\pi$ decreases the design freedom in selecting an appropriate diffraction optical surface, which may be a problem.

BRIEF SUMMARY OF THE INVENTION

The present invention relates to an objective lens for different optical recording media and an optical pickup device utilizing it wherein one of two light beams of different wavelengths can be precisely focused onto a selected one of two optical recording media that require different numerical apertures and different wavelengths for recording/playback depending on which recording medium is currently being used for recording or readout. More particularly, it provides an objective lens and an optical pickup device that provide numerical apertures (i.e., the proper focusing effect) that correspond to each of two optical recording media that are designed using different optical recording standards while insuring that the objective lens and optical pickup device are both compact and low in cost.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1A:
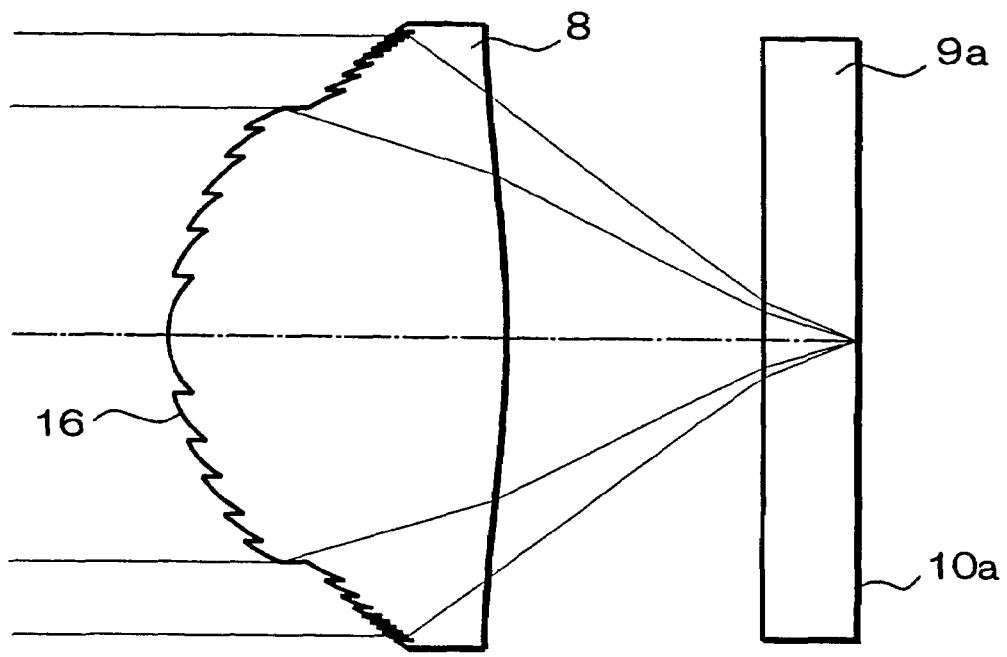
FIGS. 1A and 1B are cross-sectional views illustrating an objective lens for different optical recording media of the present invention, with FIG. 1A illustrating the case where the optical disk is a DVD, and with FIG. 1B illustrating the case where the optical disk is a CD.

The objective lens for different optical recording media of the present invention is characterized by the following three features.

First, a selected one of two light beams having different wavelengths is focused onto a respective desired position of a selected one of the different optical recording media. More specifically, when a first optical recording medium is used, a first light beam having a first wavelength is focused at a first numerical aperture onto a specified position of the first optical recording medium and, when a second optical recording medium is used, a second light beam having a second wavelength is focused at a second numerical aperture onto a specified position of the second optical recording medium, with the second wavelength being different than the first wavelength and the second numerical aperture being different than the first numerical aperture.

Second, the objective lens includes an aspheric surface that has a discontinuity on at least one surface thereof. The objective lens also includes a diffraction optical surface that is defined using a specified phase difference function.

Third, the objective lens is constructed so that, by the combined effect of the objective lens and the diffraction optical surface: light passing through an inner region and an outer region that together correspond to a first numerical aperture is focused onto a specified position of the first optical recording medium for light of the first wavelength; light passing through the inner region corresponding to the second numerical aperture is focused onto a specified position of the second optical recording medium for light of the second wavelength. Thus, when using the second optical recording medium, incident recording/playback light of the second wavelength (i.e., the wavelength that is appropriate for this recording medium) that is incident onto the outer region will not be focused onto the specified position for the second recording medium.

Also, it is preferred that the diffraction optical surface and the aspheric surface are jointly formed on the same surface of the objective lens, and that a single phase difference function that defines the diffraction optical surface has a value that is an integer multiple of $2\pi$ at the position of the discontinuity.

Also, it is preferred that:

(a) the second optical recording medium has a thicker substrate than that of the first optical recording medium, and that $\lambda 1 < \lambda 2$, where $\lambda 1$ is the first wavelength and $\lambda 2$ is the second wavelength;

(b) the objective lens for optical recording media of the present invention is made of plastic; and (c) the numerical aperture NA of focused light at the position where the aspheric surface becomes discontinuous is in the range $0.45 \leq NA \leq 0.52$.

Furthermore, the optical pickup device of the present invention is characterized by being equipped with the objective lens for optical recording media of the present invention.

Note that the term "becomes discontinuous" as used above means that the surface changes 'height' (i.e., its position in a direction parallel to the optical axis) abruptly inside versus outside this position.

Figure 2:
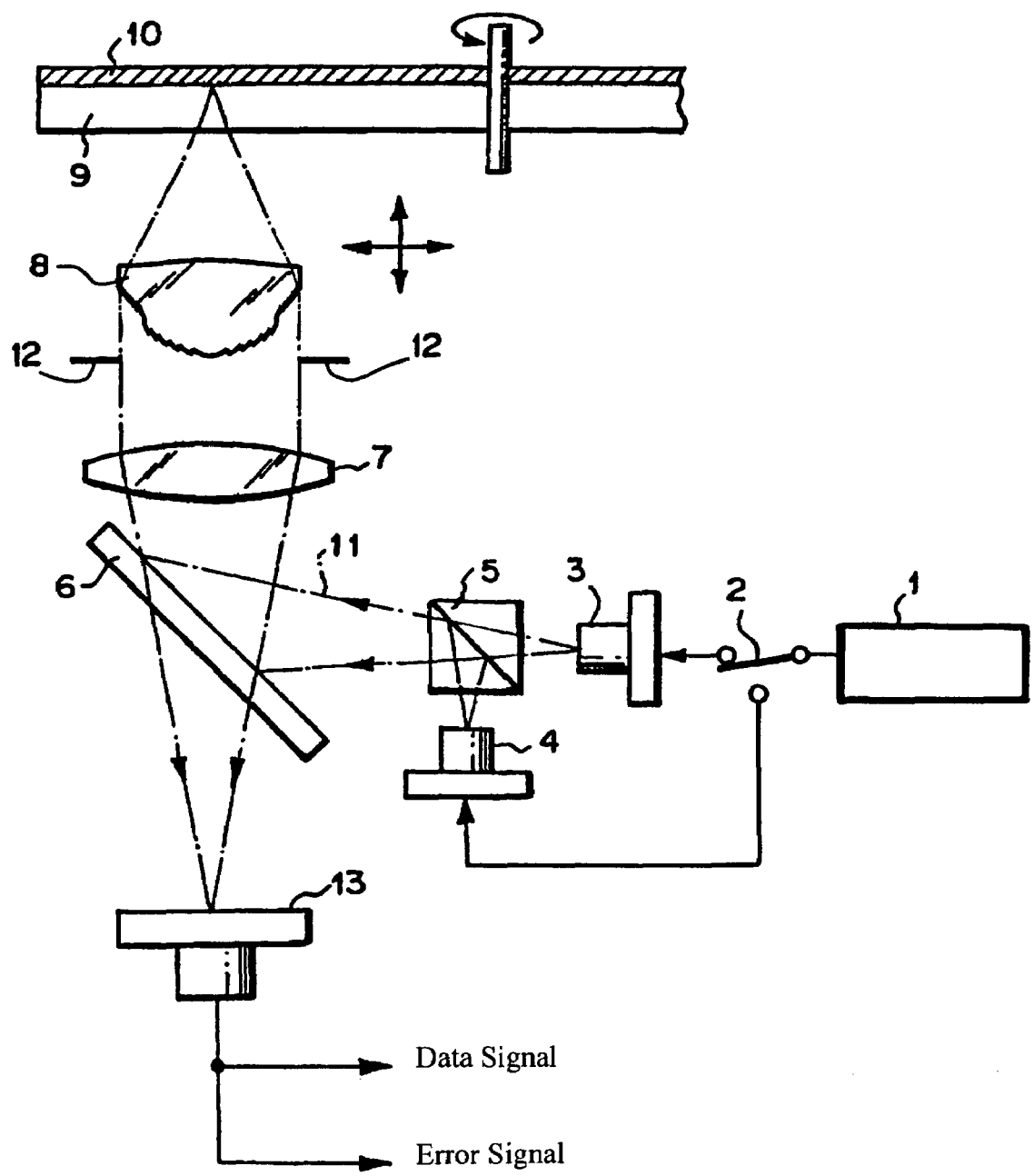
FIG. 2 shows an optical pickup device using the objective lens for different optical recording media according to the present invention.

The invention will be first be explained with reference to FIG. 2 which shows an optical pickup device using the objective lens for optical recording media of the present invention. As shown in FIG. 2, in an optical pickup device that uses the objective lens for optical recording media according to the invention, a laser beam 11 that may be output from a selected one of the semiconductor lasers 3 and 4 that are powered by a power supply 1 is reflected by a half-reflective mirror 6, substantially collimated by a collimator lens 7, focused by the objective lens 8 for optical recording media of the present invention, and irradiated onto a recording region 10 of an optical disk 9. The semiconductor laser 3 outputs laser light in the visible range having wavelengths centered at 650 nm ($\lambda 1$) for DVD recording/playback, and the semiconductor laser 4 outputs laser light in the near-infrared range having wavelengths centered at 780 nm ($\lambda 2$) for CD recording/playback. Thus, a laser beam 11 that is output from either the semiconductor laser 3 or 4 is irradiated onto the half-reflective mirror 6 via a prism 5. Also, a switch 2 is placed between the power supply 1 and the semiconductor lasers 3 and 4, so that power may be supplied to either the semiconductor laser 3 or 4, as desired, by operating the switch 2. Furthermore, a stop 12 is placed on the light-source side of the objective lens 8.

The optical pickup device of the present invention is constructed so that recording/playback of information becomes possible using either a CD or a DVD optical disk. Bits carrying signal information are arranged in track form in the recording region 10 of the optical disk 9. Light of the laser beam 11 that is reflected from this recording region 10 is incident onto the half-reflective mirror 6 via the objective lens 8 and the collimator lens 7 in a state of carrying signal information, and is transmitted by this half-reflective mirror 6 so as to be incident onto a photo diode 13 that has been divided into four quadrants. On this photo diode 13, because the amount of light received at each of the quadrants forms an electric signal, a specified computation based on the amount of received light in each quadrant is performed in a computing means (not shown), and data signals as well as error signals for focusing and tracking are obtained.

Because the half-reflective mirror 6 is inclined 45° relative to the path of returned light from the optical disk 9, astigmatism is generated by the half-reflective mirror 6 for light that is transmitted by this half-reflective mirror. The amount of focusing error is determined according to the shape of the beam spot of the returned light that is incident on the photo diode 13 that has been divided into four quadrants. The collimator lens may be omitted, depending on the situation, and it is further possible to insert a diffraction grating between the semiconductor lasers 3 and 4 and the half-reflective mirror 6 in order to detect tracking errors using three light beams.

Figure 1B:
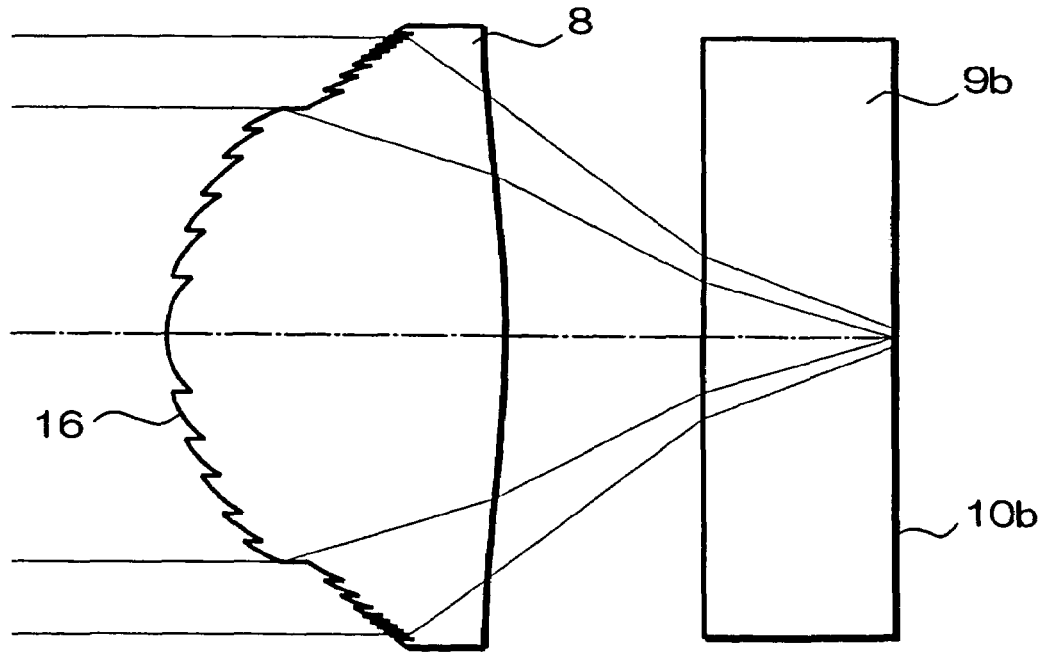

Whether the optical disk 9 is a CD or a DVD, it has a protective layer made of poly-carbonate, with the geometric thickness of the protective layer being standardized at 1.2 mm for a CD and at approximately 0.6 mm for a DVD. FIG. 1A illustrates the focusing state when the optical disk 9a is a DVD, and FIG. 1B illustrates the focusing state when the optical disk 9b is a CD. In this way, when the disk thicknesses of the two optical recording media are different, the amount of spherical aberration that is generated varies due to the difference in thickness of the protective layer as well as due to the different wavelengths of the light used. In order to precisely focus the recording/playback beam when using these different optical recording media disks, the amount of spherical aberration needs to be optimized for each wavelength of light used. Thus, a construction is required that provides different focusing effects, depending on the wavelength of light used when using a particular optical recording medium.

Therefore, in the objective lens 8 for optical recording media, an aspheric surface that is defined using an aspheric equation having a discontinuity at the boundary that corresponds to the numerical aperture for a CD 9b is formed on at least one surface, and a diffraction optical surface that is defined by a single specified phase difference function is formed on at least one surface. Thus, the objective lens is designed so that light having a wavelength suitable for DVD recording/playback is precisely focused as a spot onto a recording region 10a of DVD 9a (see FIG. 1A) with a relatively large numerical aperture suitable for recording/playback of a DVD, and light having a wavelength suitable for CD recording/playback is precisely focused as a spot onto a recording region 10b (see FIG. 1B) with a smaller numerical aperture. The light of the wavelength suitable for CD recording/playback that passes outside the discontinuity that corresponds to the outer limit of the numerical aperture required for CD recording/playback is not precisely focused onto the recording region 10b of CD 9b, as shown in FIG. 1B, and indeed is diffracted to regions outside the focus spot for CD recording/playback.

The shape of this aspheric surface is defined using Equation (A) listed below:

$$Z=[(CY^2)/\{1+(1-K \cdot C^2 \cdot Y^2)^{1/2}\}]+\Sigma(A_i \cdot Y^{2i})+B \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface on the optical axis, Y is the distance (in mm) from the optical axis, K is the eccentricity, and $A_i$ is the ith aspheric coefficient, and the summation extends from i=2 upwards, and B is a constant which changes value at the discontinuity.

Thus, the aspheric surface is discontinuous at the boundary area corresponding to the smaller numerical aperture for a CD that is required for recording/playback of information. The surface 16 on the light source side of the objective lens 8 is shown in FIGS. 1A and 1B with the abrupt change in height at the discontinuity greatly exaggerated in size for purposes of illustration.

Importantly, the diffraction optical surface shape is defined using a single, specified phase difference function Φ, defined by Equation (B) below:

$$\Phi = \Sigma W_i Y^{2i} \quad \text{Equation (B)}$$

where

Y is the distance from the optical axis, and $W_i$ is the 2i-th order coefficient.

By this diffraction optical surface, an optical path difference of $\lambda \cdot \Phi/(2\pi)$ is added to the diffracted light, with the wavelength of the incident light being denoted as λ. Note that the diffraction optical surface of the objective lens 8 of the present invention ranges from near the optical axis to the numerical aperture required for the DVD, and that the specified phase difference function Φ is defined using one set of coefficients $W_i$. By defining the diffraction optical surface shape using a single phase difference function having a single set of coefficients, its pattern becomes continuous and restrictions on the design of the objective lens are reduced, thereby allowing greater design freedom since the number of solutions which can suppress aberrations a specified amount increase.

As shown in FIGS. 1A and 1B a diffraction optical surface is formed on the objective lens 8 surface on the light source side as a single unit with the lens substrate, and has a cross-sectional shape consisting of saw-tooth-shaped, concentric gratings. Note that the saw-tooth shape of the actual diffraction optical surface is grossly exaggerated in FIGS. 1A and 1B for ease of illustration and better understanding.

The specific grating pitch of the diffraction optical surface is determined by the phase difference function. Also, the height of the steps of the saw-teeth of the diffraction optical surface is set considering the ratio of diffracted light of each diffraction order for the laser light of each wavelength. Also, the outermost diameter of the diffraction optical surface is determined considering the desired numerical apertures and the beam diameters of the incident laser beams at the two wavelengths.

In this way, when DVD 9a is placed at a specified position (i.e., on a turn table) as the optical disk 9 and its recording/playback is performed as shown in FIG. 1A, a laser beam λ1 having wavelengths centered at about 650 nm that is emitted from the semiconductor laser 3 (FIG. 2) is incident onto the objective lens 8 in a state of being substantially collimated, having passed through the collimator lens 7 (FIG. 2), is corrected for aberrations, and is focused onto the recording region 10a of DVD 9a.

On the other hand, when CD 9b is placed at a specified position (i.e., on the turn table) as the optical disk 9 and its recording/playback is performed as shown in FIG. 1B, the laser beam λ2 having wavelengths centered at about 780 nm that is emitted from the semiconductor laser 4 is incident onto the objective lens 8 in a state of being substantially collimated, having passed through the collimator lens 7, is corrected for aberrations, and is focused onto the recording region 10b of CD 9b. Although the laser beam 11 from the semiconductor laser 4 also passes through the region outside the discontinuity that would otherwise produce a light beam having a larger numerical aperture than is appropriate for recording/playback using a CD, this light flux is not focused as a precise beam spot and, in fact, is diverted away and is incident onto a broader region than the active recording/playback region of the surface 10b of the CD 9b.

The difference in the aberrations that are generated due to the optical disk 9 being different is largely due to the disk thickness. However, the aberration correction effect produced by the objective lens 8 of the present invention is effective also for aberrations that are generated due to other factors, such as the difference in wavelengths of the incident light for the two different optical recording media.

Figure 3A:
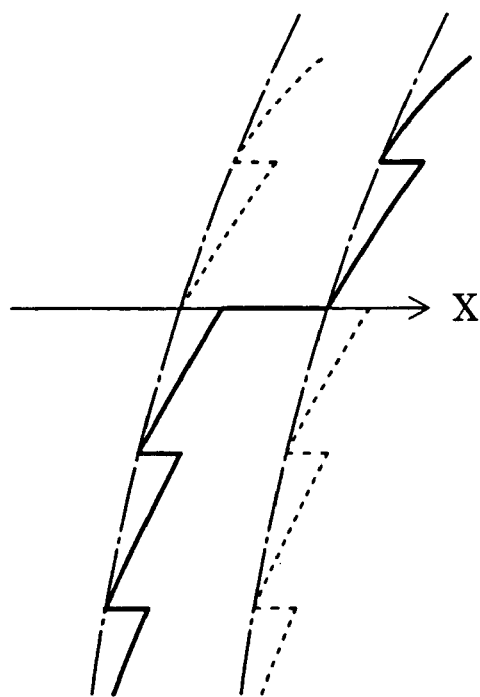
FIGS. 3A and 3B are illustrations for explaining the phase difference state of a diffraction optical surface for incident rays at two different positions on the steps of the diffraction optical surface.
Figure 3B:
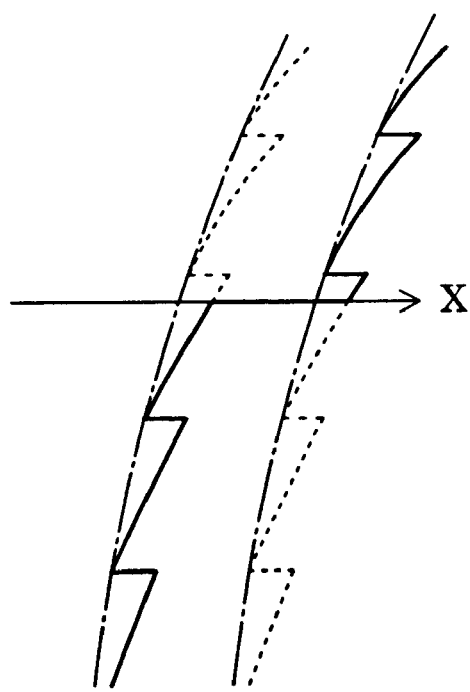

In this objective lens 8, it is preferred that the diffraction optical surface and the aspheric surface each partially define an objective lens surface by both being formed on the same surface in a superimposed manner, and that the phase difference of the diffraction optical surface is an integer multiple of 2π where the aspheric surface shape becomes discontinuous. FIG. 3A illustrates a state where the phase difference of the diffraction optical surface becomes an integer multiple of 2π at the discontinuity. Also, FIG. 3B illustrates a state where the phase difference of the diffraction optical surface is not an integer multiple of 2π at the discontinuity. In FIG. 3A and FIG. 3B, a thick, solid line indicates the lens shape, and the steps are formed so that the depths in the X direction (i.e., parallel to the optical axis) are different from one another between the two figures. Note that the "mother" surface is shown in both figures as being spherical, for simplicity of illustration.

By making the aspheric surface discontinuous, the freedom in designing a lens shape which can focus onto two different positions according to the wavelength of light utilized, as stated above, increases. Also, in order to prevent a disturbance of the wave front aberration at the discontinuity, it is preferable to make the phase difference caused by the phase difference function at the boundary of adjacent saw-teeth an integer multiple of 2π. This enables restrictions on the lens design to be decreased by defining the phase difference function continuously using a single phase difference function and with a single set of coefficients. In this way, the present invention makes it possible to design an objective lens having a performance of the same degree as previously but with a higher degree of freedom so as to provide a compact and inexpensive objective lens of one-piece construction. Also, the objective lens 8 can be made light-weight and inexpensive by making it of plastic.

It is preferred that, when the optical disk corresponding to the smaller numerical aperture is a CD, the numerical aperture NA at the position where the aspheric surface becomes discontinuous is in the range $0.45 \leq NA \leq 0.52$.

Note that in the objective lens 8 for optical recording media explained above, the specified aspheric surface and diffraction optical surface are formed on the first lens surface 16. Other alternatives are available in designing the objective lens. For example, both the aspheric surface and diffraction optical surface may be formed on the surface of the objective lens nearest the optical recording medium side, or the diffraction optical surface may be formed on one side of the objective lens, and the aspheric surface on the other. Theoretically, the same effect as that discussed above can be obtained if the design of the aspheric surface and the diffraction optical surface are appropriately made.

Forming the specified aspheric surface and diffraction optical surface on the surface of the objective lens nearest the light source is advantageous when considering diffraction efficiency and the degree of focusing of the beam spot, etc., since the incident light on this side is approximately parallel to the optical axis.

Moreover, forming the diffraction optical surface on one of the surfaces of the objective lens and forming the discontinuous aspheric surface on the other surface of the objective lens is disadvantageous in terms of greater cost because the lens processing becomes more extensive than when forming a single surface with the diffraction and aspheric features superimposed.

Various embodiments of the present invention will now be set forth in detail Each objective lens is an objective lens for recording or playing out information on optical recording media, preferably using two different kinds of optical disks, such as CD and DVD, and both surfaces of the objective lens are made aspheric. Also, the aspheric surface on the first surface of the objective lens is made to be discontinuous and, further, a diffraction optical surface is formed on the aspheric surface. A laser beam of either wavelength that is incident onto the objective lens may be accurately focused onto a recording region of a corresponding optical disk by the present invention.

EMBODIMENT 1

Table 1 below lists the surface #, in order from the light-source side, the radius of curvature R (in this case, whether the particular surface shape is formed as a combined diffractive/aspheric surface D/A, merely an Aspheric surface A, or planar—with $R=\infty$), the on-axis surface spacings D at the wavelengths $\lambda=657$ nm and 790 nm, and the indexes of refraction at the wavelengths $\lambda=657$ nm and 790 nm. The reason the distance D changes as a function of wavelength for some surfaces is that, as is apparent from viewing FIGS. 1A and 1B, the substrate thickness, focal plane position and wavelength of the recording/playback beam change when using a DVD (in this embodiment, the wavelength used is at $\lambda=657$ nm (FIG. 1A)), versus a CD (in this embodiment, the wavelength used is at $\lambda=790$ nm (FIG. 1B)).

TABLE 1

| # | R | D $\lambda = 657$ nm | D $\lambda = 790$ nm | N $\lambda = 657$ nm | N $\lambda = 790$ nm |
|---|---|---|---|---|---|
| 1 | D/A | 2.220 | 2.220 | 1.50566 | 1.50222 |
| 2 | A | 1.760 | 1.397 | 1.00000 | 1.00000 |
| 3 | $\infty$ | 0.600 | 1.200 | 1.58000 | 1.57000 |
| 4 | $\infty$ | | | | |

Table 2 below lists the values of the stop diameter $\Phi$ (in mm), the focal length f (in mm), the numerical aperture NA, and the distance of the light source from the object side of the objective lens (light source position) for the objective lens of this embodiment in the case that the optical recording medium is a DVD (wavelength used is $\lambda=657$ nm) versus a CD (wavelength used is $\lambda=790$ nm)

TABLE 2

| | $\lambda = 657$ nm | $\lambda = 790$ nm |
|---|---|---|
| stop diameter, $\Phi$ | 4.0 | 4.0 |
| focal length, f | 3.33 | 3.35 |
| numerical aperture, NA | 0.60 | 0.46 |
| light source position | $\infty$ | $\infty$ |

Table 3 below lists the values of the constants C, K and B used in Equation (A) above, as well as the aspherical coefficients $A_2$-$A_6$ of each aspheric surface of this embodiment. Those aspherical coefficients that are not listed in the table are zero.

TABLE 3

| | 1st Surface, Y < 1.532 mm | 1st Surface, Y $\geq$ 1.532 mm | 2nd Surface |
|---|---|---|---|
| C | 4.8065142E−1 | 5.6594284E−1 | −1.7998240E−1 |
| K | 0.0 | 0.0 | 0.0 |
| B | 0.0 | −3.4916686E−2 | 0.0 |
| $A_2$ | 3.2661442E−3 | −1.2663155E−2 | 1.3916007E−2 |
| $A_3$ | 4.0564687E−5 | 6.1794537E−4 | −4.1050739E−3 |
| $A_4$ | −3.0569735E−4 | 1.6113424E−4 | 6.8338620E−5 |
| $A_5$ | −8.9492924E−5 | 5.4288256E−5 | 2.6249482E−5 |
| $A_6$ | 4.9662256E−5 | −6.5613921E−6 | |

Table 4 below lists the values of the phase difference function coefficients $W_1$-$W_5$ of the diffraction optical surface of the objective lens of this embodiment.

TABLE 4

| | |
|---|---|
| $W_1$ | 4.8172447 |
| $W_2$ | −1.0393242E+1 |
| $W_3$ | 1.811292 |
| $W_4$ | −3.3735647 |
| $W_5$ | 9.5888877E−1 |

Figure 4A:
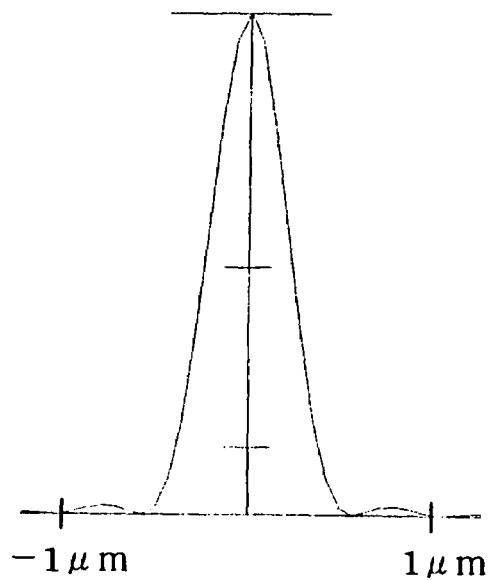
FIGS. 4A and 4B show beam profiles at two different wavelengths in the case where focusing is performed using the objective lens according to Embodiment 1.
Figure 4B:
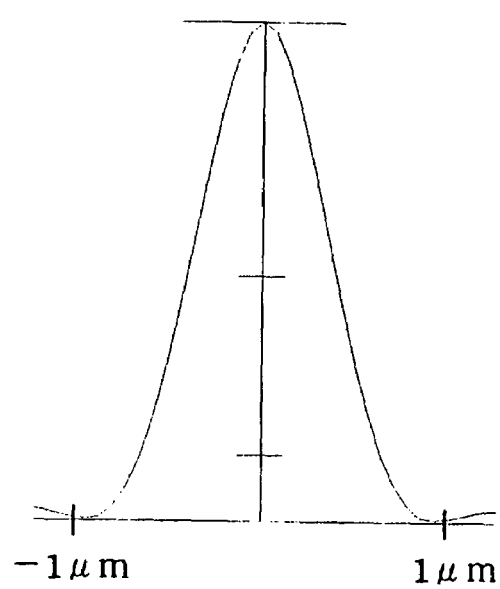

FIGS. 4A and 4B show, for the used wavelengths of 657 nm and 790 nm, respectively, the beam profile (i.e., a plot of the beam intensity on the Y-axis versus, on the X-axis, the distance from the optical axis on the recording region 10*a* or 10*b*). As is clear from FIGS. 4A and 4B, the objective lens of this embodiment provides a well-focused beam spot corresponding to the required numerical aperture and the wavelength needed to record/read on both a DVD and CD optical recording medium, respectively.

EMBODIMENT 2

In this embodiment, the wavelengths used for recording/playback for the two optical recording media, as well as the other construction data, differ from those of Embodiment 1.

Table 5 below lists the surface #, in order from the light-source side, the radius of curvature R (in this case, whether the particular surface shape is formed as a combined diffractive/aspheric surface D/A, merely an Aspheric surface A, or planar—with R=∞, the on-axis surface spacings D at the wavelengths of λ=650 nm and λ=780 nm, and the indexes of refraction at the wavelengths of λ=650 nm and λ=780 nm.

TABLE 5

| | | D | | N | |
|---|---|---|---|---|---|
| # | R | λ = 650 nm | λ = 780 nm | λ = 650 nm | λ = 780 nm |
| 1 | D/A | 2.230 | 2.230 | 1.50591 | 1.50240 |
| 2 | A | 1.230 | 0.865 | 1.00000 | 1.00000 |
| 3 | ∞ | 0.600 | 1.200 | 1.58000 | 1.57000 |
| 4 | ∞ | | | | |

Table 6 below lists the values of the stop diameter Φ (in mm), the focal length f (in mm), the numerical aperture NA, and the distance of the light source from the object side of the objective lens (light source position) for the objective lens of this embodiment in the case that the optical recording medium is a DVD (wavelength used is λ=650 nm) versus a CD (wavelength used is λ=780 nm).

TABLE 6

| | λ = 650 nm | λ = 780 nm |
|---|---|---|
| stop diameter, Φ | 4.20 | 4.20 |
| focal length, f | 3.50 | 3.52 |
| numerical aperture, NA | 0.60 | 0.45 |
| light source position | ∞ | ∞ |

Table 7 below lists the values of the constants C, K and B used in Equation (A) above, as well as the aspherical coefficients $A_2$-$A_5$ of each aspheric surface of this embodiment. Those aspherical coefficients that are not listed in the table are zero.

TABLE 7

| | 1st Surface, Y < 1.6 mm | 1st Surface, Y ≧ 1.6 mm | 2nd Surface |
|---|---|---|---|
| C | 4.7667665E−1 | 8.4232296E−1 | −1.3998688E−1 |
| K | 0.0 | 0.0 | 0.0 |
| B | 0.0 | −1.2163720E−1 | 0.0 |
| $A_2$ | 4.4889931E−3 | −1.0508691E−1 | 1.5845130E−2 |
| $A_3$ | 1.4229360E−4 | 3.2790416E−2 | −1.9786923E−3 |
| $A_4$ | 5.3163977E−5 | −4.7689488E−3 | −2.4682603E−4 |
| $A_5$ | 8.2255329E−6 | 2.8894428E−4 | 5.9504280E−5 |

Table 8 below lists the values of the phase difference function coefficients $W_1$-$W_5$ of the diffraction optical surface of the objective lens of this embodiment.

TABLE 8

| $W_1$ | 4.8322829 |
|---|---|
| $W_2$ | −1.0468958E+1 |
| $W_3$ | −1.2223717 |

TABLE 8-continued

| $W_4$ | 1.4991419E−1 |
|---|---|
| $W_5$ | 6.7993867E−2 |

Figure 5A:
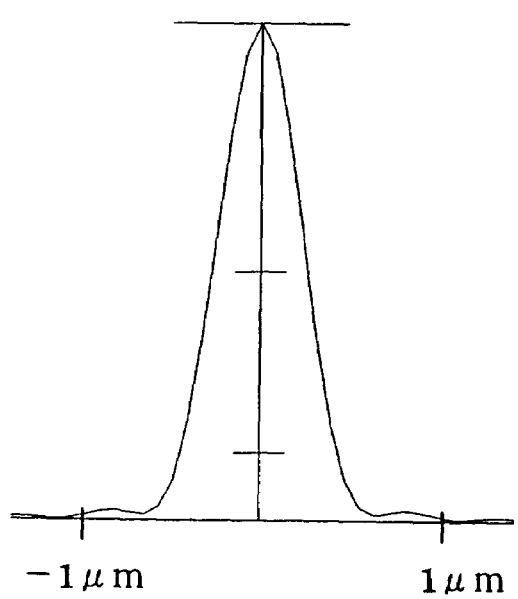
FIGS. 5A and 5B show beam profiles at two different wavelengths in the case where focusing is performed using the objective lens according to Embodiment 2.
Figure 5B:
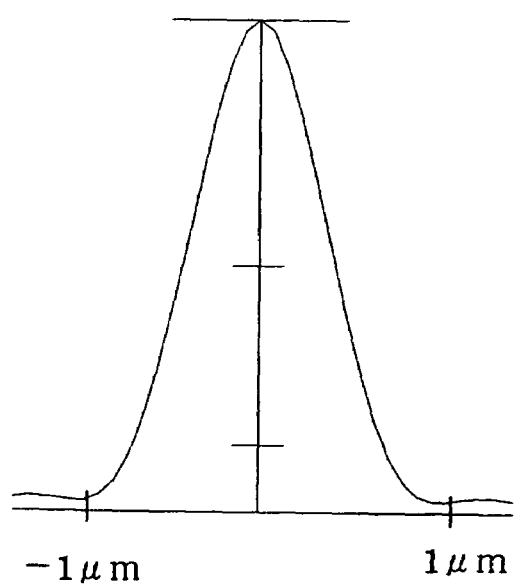

FIGS. 5A and 5B show, for the used wavelengths of 650 nm and 780 nm, respectively, the beam profile (i.e., a plot of the beam intensity on the Y-axis versus, on the X-axis, the distance from the optical axis on the recording region 10a or 10b). As is clear from FIGS. 5A and 5B, the objective lens of this embodiment provides a well-focused beam spot corresponding to the required numerical aperture and the wavelength needed to record/read on both a DVD and CD optical recording medium, respectively.

EMBODIMENT 3

In this embodiment, the wavelengths used for recording/playback for the two optical recording media, as well as the other construction data, differ from those of Embodiments 1 and 2.

Table 9 below lists the surface #, in order from the light-source side, the radius of curvature R (in this case, whether the particular surface shape is formed as a combined diffractive/aspheric surface D/A, merely an Aspheric surface A, or planar—with R=∞), the on-axis surface spacings D at the wavelengths of λ=657 nm and λ=785 nm, and the indexes of refraction at the wavelengths of λ=657 nm and λ=785 nm.

TABLE 9

| | | D | | N | |
|---|---|---|---|---|---|
| # | R | λ = 657 nm | λ = 785 nm | λ = 657 nm | λ = 785 nm |
| 1 | D/A | 1.330 | 1.330 | 1.505660 | 1.502310 |
| 2 | A | 1.230 | 0.865 | 1.000000 | 1.000000 |
| 3 | ∞ | 0.600 | 1.200 | 1.580000 | 1.570000 |
| 4 | ∞ | | | | |

Table 10 below lists the values of the stop diameter Φ (in mm), the focal length f (in mm), the numerical aperture NA, and the distance of the light source from the object side of the objective lens (light source position) for the objective lens of this embodiment in the case that the optical recording medium is a DVD (wavelength used is λ=657 nm) versus a CD (wavelength used is λ=785 nm).

TABLE 10

| | λ = 657 nm | λ = 785 nm |
|---|---|---|
| stop diameter, Φ | 2.808 | 2.808 |
| focal length, f | 2.34 | 2.36 |
| numerical aperture, NA | 0.60 | 0.51 |
| light source position | ∞ | ∞ |

Table 11 below lists the values of the constants C, K and B used in Equation (A) above, as well as the aspherical coefficients $A_2$-$A_5$ of each aspheric surface of this embodiment. Those aspherical coefficients that are not listed in the table are zero.

TABLE 11

| | 1st Surface, Y < 1.196 mm | 1st Surface, Y ≧ 1.196 mm | 2nd Surface |
|---|---|---|---|
| C | 7.1004521E-1 | 7.1208302E-1 | -2.1290141E-1 |
| K | 0.0 | 0.0 | 0.0 |
| B | 0.0 | 6.0006974E-3 | 0.0 |
| $A_2$ | 1.0034500E-2 | 1.5658997E-2 | 4.5765243E-2 |
| $A_3$ | 9.7862875E-3 | -2.0403294E-3 | -1.4171491E-2 |
| $A_4$ | -8.6232186E-3 | -5.3355792E-3 | 2.9795647E-2 |
| $A_5$ | 5.4946331E-3 | 5.9857836E-3 | -1.0676524E-2 |

Table 12 below lists the values of the phase difference function coefficients $W_1$-$W_5$ of the diffraction optical surface of the objective lens of this embodiment.

TABLE 12

| | |
|---|---|
| $W_1$ | 2.7495889E+1 |
| $W_2$ | -5.3070548E+1 |
| $W_3$ | 2.5780703E+1 |
| $W_4$ | -3.6215469E+1 |
| $W_5$ | 1.2738450E+1 |

Figure 6A:
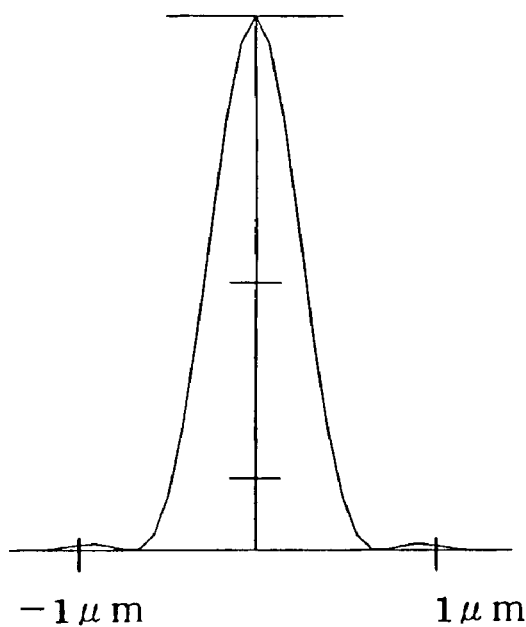
FIGS. 6A and 6B show beam profiles at two different wavelengths in the case where focusing is performed using the objective lens according to Embodiment 3.
Figure 6B:
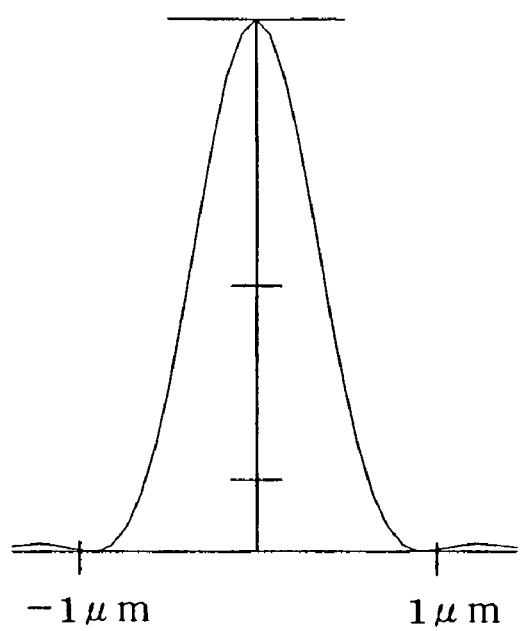

FIGS. 6A and 6B show, for the wavelengths of 657 nm and 785 nm, respectively, the beam profile (i.e., a plot of the beam intensity on the Y-axis versus, on the X-axis, the distance from the optical axis on the recording region 10a or 10b). As is clear from FIGS. 6A and 6B, the objective lens of this embodiment provides a well-focused beam spot corresponding to the required numerical aperture and the wavelength needed to record/playback either a DVD or a CD optical recording medium, respectively.

The invention being thus described, it will be obvious that the same may be varied in many ways. For example, in the optical pickup device of the present invention, the optical recording media used are not limited to the combination of a DVD and a CD. In the combination of a DVD and a CD, where the CD has a thicker substrate than the DVD, the DVD requires the larger numerical aperture, and the CD requires the longer wavelength; however, two optical recording media having different specifications in the wavelength range used and numerical aperture can be applied to a common optical pickup device in recording/playback. For two optical recording media having specifications different from each other, the present invention can be applied where the disk thicknesses are the same, and where one optical recording medium has a larger wavelength that is used. Which optical recording medium requires a larger corresponding numerical aperture depends on the circumstances of the construction, and the construction of the diffraction optical surface and aspheric surface of the objective lens can be set based on these.

Also, the objective lens of the present invention may be given a specified aspheric surface on only one surface. In addition, the saw-teeth of the aspheric surface(s) may be made with a depth parallel to the optical axis in the outer region that is more shallow than that of the inner region.

As a manufacturing method of the diffraction optical surface of the objective lens, it is possible to use glass or plastic as the lens base material, and to form the steps of the diffraction optical surface with a thin resin layer on a lens base material (i.e., use a composite aspheric surface), or to form the steps by vapor-depositing titanium dioxide ($TiO_2$) or various other materials, such as metals, metal oxides and non-metals instead of using titanium dioxide ($TiO_2$). Further, it is possible to form the saw-teeth by sputtering, plating, roll coating, etc., instead of by vapor deposition.

Furthermore, the diffraction optical surface may be formed so that the cross-sectional shape consists of staircase-shaped concentric gratings, with various numbers of stairs such as two or larger being used, or a rectangular-shaped cross section can also be adopted. Also, in the optical pickup device of the invention, where light sources that output light beams of different wavelengths are installed, a single light source that can output light beams of multiple different wavelengths may instead be installed. Such variations are not to be regarded as a departure from the spirit and scope of the invention. Rather, the scope of the invention shall be defined as set forth in the following claims and their legal equivalents. All such modifications as would be obvious to once skilled in the art are intended to be included within the scope of the following claims.

What is claimed is:

1. An objective lens for different optical recording media which, for a selected first optical recording medium, focuses at a first numerical aperture an incident light beam having a first wavelength onto a desired position of the first optical recording medium and, for a selected second optical recording medium, focuses at a second numerical aperture that is smaller than the first numerical aperture, an incident light beam having a second wavelength onto a desired position of the second optical recording medium, said objective lens comprising:

at least one surface that is at least partially an aspheric surface that is defined using an equation for an aspheric surface wherein the surface height in the direction of the optical axis becomes discontinuous at a boundary line corresponding to the outer boundary of incident light of the second wavelength that is focused at the second numerical aperture onto a specified position of the second optical recording medium;

at least one surface that is at least partially a diffraction optical surface that is defined using one phase difference function, said diffraction optical surface constructed so that a) the light flux of the first wavelength passing through a region of the diffraction optical surface corresponding to tho first numerical aperture is focused onto a specified position of the first optical recording medium by the refractive power of the objective lens and the light diffraction effect of the diffraction optical surface, b) the light flux of the second wavelength passing through the region of the diffraction optical surface that is outside the region that corresponds to the second numerical aperture is not focused onto the specified position of the second optical recording medium by the refractive power of the objective lens and the light diffraction effect of the diffraction optical surface, and c) the light flux of the second wavelength passing through the region of the diffraction optical surface corresponding to the second numerical aperture is focused onto the specified position of the second recording medium by the refractive power of the objective lens and the light diffraction effect of the diffraction optical surface;

wherein:

the diffraction optical surface and the aspheric surface are jointly formed so as to be superimposed on the same surface; and the phase difference defined by the one phase difference function of the diffraction optical surface is an integer multiple of $2\cdot\pi$ where the aspheric surface becomes discontinuous on this same surface.

2. The objective lens for different optical recording media according to claim 1, wherein the second optical recording medium has a substrate that is thicker than that of the first optical recording medium, and the first wavelength is shorter than the second wavelength.

3. The objective lens for different optical recording media according to claim 1, wherein the objective lens is made of plastic.

4. The objective lens for different optical recording media according to claim 2, wherein the objective lens is made of plastic.

5. The objective lens for different optical recording media according to claim 1, wherein the numerical aperture NA at the position where the aspheric surface becomes discontinuous is set to a value in the range $0.45 \leq NA \leq 0.52$.

6. The objective lens for different optical recording media according to claim 2, wherein the numerical aperture NA at the position where the aspheric surface becomes discontinuous is set to a value in the range $0.45 \leq NA \leq 0.52$.

7. The objective lens for different optical recording media according to claim 3, wherein the numerical aperture NA at the position where the aspheric surface becomes discontinuous is set to a value in the range $0.45 \leq NA \leq 0.52$.

8. The objective lens for different optical recording media according to claim 4, wherein the numerical aperture NA at the position where the aspheric surface becomes discontinuous is set to a value in the range $0.45 \leq NA \leq 0.52$.

9. An optical pickup device that includes the objective lens for different optical recording media according to claim 1.

10. An optical pickup device that includes the objective lens for different optical recording media according to claim 2.

* * * * *